(12) United States Patent
Cui et al.

(10) Patent No.: US 12,511,548 B2
(45) Date of Patent: Dec. 30, 2025

(54) RESOURCE-EFFICIENT TRAINING OF A SEQUENCE-TAGGING MODEL

(71) Applicant: Microsoft Technology Licensing, LLC, Redmond, WA (US)

(72) Inventors: Wen Cui, Los Altos, CA (US); Keng-hao Chang, San Jose, CA (US); Pai Chun Lin, Fremont, CA (US); Mohammadreza Khalilishoja, Sunnyvale, CA (US); Eren Manavoglu, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 592 days.

(21) Appl. No.: 18/075,876

(22) Filed: Dec. 6, 2022

(65) Prior Publication Data

US 2024/0185085 A1 Jun. 6, 2024

(51) Int. Cl.
*G06N 3/096* (2023.01)
*G06N 3/045* (2023.01)

(52) U.S. Cl.
CPC ............ *G06N 3/096* (2023.01); *G06N 3/045* (2023.01)

(58) Field of Classification Search
None
See application file for complete search history.

(56) References Cited

PUBLICATIONS

Siddiqa, Ayesha, Suman Banerjee, and Nikesh Garera. "Semi-supervised Named Entity Recognition to solve label scarcity challenges for E-Commerce use-cases." KDD EcomGen. Aug. 14-18, 2022. 8 pages. (Year: 2022).*

Huang, et al., "Few-Shot Named Entity Recognition: A Comprehensive Study," arXiv, Cornell University, arXiv:2012.14978v1 [cs.CL], Dec. 29, 2020, 12 pages.

Liang, et al., "BOND: BERT-Assisted Open-Domain Named Entity Recognition with Distant Supervision," in KDD '20: Proceedings of the 26th ACM SIGKDD International Conference on Knowledge Discovery & Data Mining, Aug. 2020, pp. 1054-1064.

Lewis, et al., "Heterogeneous Uncertainty Sampling for Supervised Learning," in Machine Learning: Proceedings of the Eleventh International Conference, 1994, pp. 148-156.

(Continued)

*Primary Examiner* — Vincent Gonzales

(57) ABSTRACT

A technique iteratively updates model weights of a teacher model and a student model. In operation, the teacher model produces noisy original pseudo-labeled training examples from unlabeled training examples. The technique weights the original pseudo-labeled training examples based on validation information. The technique then updates model weights of the student model based on the weighted pseudo-labeled training examples. The validation information, which is used to weight the original pseudo-labeled training examples, is produced by selecting labeled training examples based on an uncertainty-based factor and a similarity-based factor. The uncertainty-based factor describes an extent to which the student model produces uncertain classification results for the set of labeled training examples. The similarity-based factor describes the similarity between the set of labeled training examples and the unlabeled training examples. Overall, the technique is efficient because it eliminates the need to produce a large number labeled training examples.

20 Claims, 9 Drawing Sheets

(56) References Cited

PUBLICATIONS

Wang, et al., "Meta Self-training for Few-shot Neural Sequence Labeling," in KDD '21: Proceedings of the 27th ACM SIGKDD Conference on Knowledge Discovery & Data Mining, Aug. 2021, pp. 1737-1747.

Ren, et al., "Learning to Reweight Examples for Robust Deep Learning," arXiv, Cornell University, arXiv:1803.09050v3 [cs.LG], May 5, 2019, 13 pages.

* cited by examiner

ILLUSTRATIVE TRAINING
PROCESS
202

INITIALIZE MODELS 208

REPEAT UNTIL MODEL TRAINING GOALS ACHIEVED 204

FINE-TUNE TEACHER MODEL WEIGHTS ON LABELED EXAMPLES 210

USE TEACHER MODEL TO GENERATE A COLLECTION OF PSEUDO-LABELED TRAINING EXAMPLES, BASED ON UNLABELED TRAINING EXAMPLES 212

REPEAT FOR $T$ ITERATIONS 206

GENERATE VALIDATION INFORMATION BASED ON LABELED TRAINING EXAMPLES 214

FORM A BATCH OF PSEUDO-LABELED TRAINING EXAMPLES FROM THE COLLECTION OF PSEUDO-LABELED TRAINING EXAMPLES 216

GENERATE RE-WEIGHTING WEIGHTS FOR THE BATCH BASED ON THE VALIDATION INFORMATION 218

UPDATE MODEL WEIGHTS OF THE STUDENT MODEL BASED PSEUDO-LABELED TRAINING EXAMPLES, AS MODIFIED BY THE RE-WEIGHTING WEIGHTS 220

UPDATE THE TEACHER MODEL WEIGHTS BASED ON THE CURRENT STUDENT MODEL WEIGHTS 222

FULLY TRAINED STUDENT MODEL

FIG. 2

OVERVIEW OF OPERATION OF THE APPLICATION SYSTEM, 1102

CLASSIFY TOKENS IN A SEQUENCE OF TOKENS USING A TRAINED TAGGING MODEL, TO PRODUCE A CLASSIFIED SEQUENCE OF TOKENS.
1104

PERFORM AN APPLICATION TASK BASED ON THE CLASSIFIED SEQUENCE OF TOKENS, THE TRAINED TAGGING MODEL BEING PRODUCED BY TRAINING A STUDENT MODEL IN A TRAINING FRAMEWORK THAT INCLUDES THE STUDENT MODEL AND A TEACHER MODEL, BASED ON THE PROCESS OF FIG. 10.
1106

FIG. 11

RESOURCE-EFFICIENT TRAINING OF A SEQUENCE-TAGGING MODEL

BACKGROUND

A machine-trained sequence-tagging model classifies tokens in a sequence of tokens. For instance, natural language processing applications commonly use sequence-tagging models to determine the classes of the words that appear in a sentence, selected from a predetermined vocabulary of possible classes. One kind of natural language processing application is a named entity recognition (NER) model.

Sequence-tagging models sometimes produce unsatisfactory results for various reasons. For instance, a training system may produce a sequence-tagging model having low quality if it is supplied an insufficient number of training examples. A developer cannot easily remedy this problem because it is often difficult to find preexisting training sets that are relevant to a given domain. Further, the process of manually producing relevant training examples is both time intensive and resource intensive in nature.

SUMMARY

The technique described herein mitigates the above-described data scarcity problem using a training framework having a teacher model and a student model. The training framework uses the teacher model to produce pseudo-labeled training examples based on a set of unlabeled training examples. The training framework then updates the student model based on the pseudo-labeled training examples. Upon the completion of training, the student model serves as a trained sequence-tagging model (henceforth, "tagging model"). The technique eliminates the need for a developer to manually provide a large number of manually-labeled training examples.

The original pseudo-labeled training examples, however, are noisy, which may ultimately impair the quality of the resultant tagging model. To address this problem, the technique weights the original pseudo-labeled training examples produced by the teacher model based on validation information, with the ultimate goal of promoting the most impactful pseudo-labeled training examples. This yields weighted pseudo-labeled training examples. The technique then updates model weights of the student model based on the weighted pseudo-labeled training examples.

The technique produces the validation information, in turn, by selecting labeled training examples based on plural factors, including an uncertainty-based factor and a similarity-based factor. The uncertainty-based factor describes an extent to which the student model produces uncertain classification results for the set of labeled training examples. The similarity-based factor describes an extent to which the set of labeled training examples are deemed similar to the unlabeled training examples.

In some implementations, the application uses the tagging model to perform any of the functions of searching, matching, filtering, etc. In a more particular application context, an application applies the tagging model to determine attribute types expressed by tokens in a description of a product.

In some implementations, the technique masks at least part of at least some of the labeled training examples. This operation facilitates training and improves the robustness of the trained tagging model.

The technique is technically advantageous because it reduces the amount of resources that are used to train a tagging model, and reduces the amount of time and effort involved in training the tagging model. The technique achieves these results, in part, by reducing noise in the original pseudo-labeled training examples produced by the teacher model; this has the effect of making a relatively small number of labeled training examples more impactful. The technique is also scalable because it is able to train models for detecting any number of tag types, even a relatively large number of tag types. The scalability of the technique stems from its ability to produce a robust tagging model based on a relatively small number of labeled training examples for each tag type.

The above-summarized technology is described herein as manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 shows an illustrative process flow that explains one manner of operation of the training framework of FIG. 1.

FIG. 11 shows a process that describes one manner of operation of the application system of FIG. 3.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative training framework for producing a sequence-tagging model, and an application system for applying the sequence-tagging model. Section B sets forth illustrative methods that explain the operation of the training framework and the application system of Section A. Section C describes illustrative computing functionality that, in some implementations, is used to implement any aspect of the features described in Sections A and B.

A. Illustrative Computing System

Figure 1:
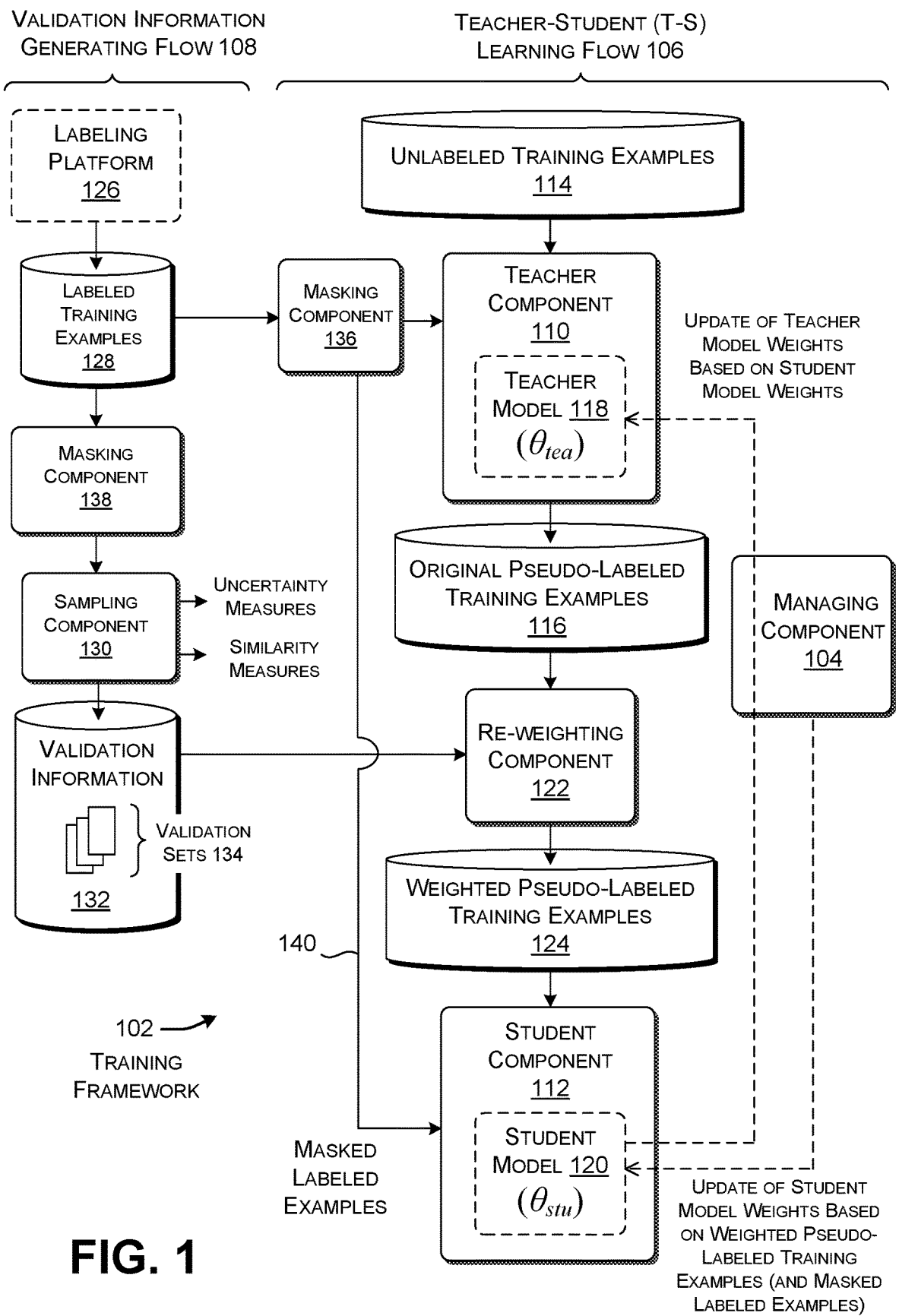
FIG. 1 shows an illustrative training framework for producing a trained tagging model, including a teacher model and a student model.

FIG. 1 shows a training framework 102 for generating a sequence-tagging model ("tagging model" henceforth). A managing component 104 manages the overall training process performed by the training framework 102. For instance, the managing component 104 implements a training process using a computer program, and the individual components shown in FIG. 1 correspond to functions within the training process.

Broadly, the training framework 102 includes a teacher-student (T-S) learning flow 106 and a validation information generating flow 108. In the T-S learning flow 106, the training framework 102 uses a teacher component 110 to generate a collection of original pseudo-labeled training examples based on a set of unlabeled training examples. The training framework trains a student component 112 based, at least in part, on the original pseudo-labeled training examples. The pseudo-labeled training examples are qualified as "original" because, as described below, they are modified at a later juncture of the T-S learning flow 106.

A data store 114 stores the unlabeled training examples. A data store 116 stores the original pseudo-labeled training examples. The teacher model 110 produces the original pseudo-labeled training examples using a teacher model 118, which includes a set of model weights denoted by $\theta_{tea}$. The student component 112 performs a sequence-tagging function using a student model 120 based on a set of model weights denoted by $\theta_{stu}$.

Each unlabeled training example in the data store 114 includes a sequence of one or more tokens, such as one or more words and/or other linguistic units. For instance, in one case, each unlabeled training example includes a title of a product that appears in an ad or other document. Each original pseudo-labeled training example in the data store 116 includes a labeled counterpart of an unlabeled training example in the data store 114. The original pseudo-labeled training example is labeled insofar as at least one of its tokens is assigned a tag type, which identifies the type of token to which it most likely corresponds, selected from among a predetermined vocabulary of possible tag types. Synonyms for "type" used herein include "class." A label expresses an attribute type. The qualifier "pseudo" in the term "original pseudo-labeled training example" means that it contains labels that approximate the kind of labels that a human would manually apply to a sequence of tokens.

As noted above, the original pseudo-labeled training examples in their original state are subject to noise, which, if left unattended, can cause model drift in the training of the student model 120. To address this problem, a re-weighting component 122 applies weights to the original pseudo-labeled training examples to promote the most valuable pseudo-labeled training examples, and to diminish the impact of the least valuable training examples. As a result of this processing, the re-weighting component 122 produces weighted pseudo-labeled training examples, which it stores in a data store 124. As will be described in greater detail below, the re-weighting component 122 specifically applies a token-specific weight to each token (e.g., each word) of an original pseudo-labeled training example under consideration.

Figure 5:
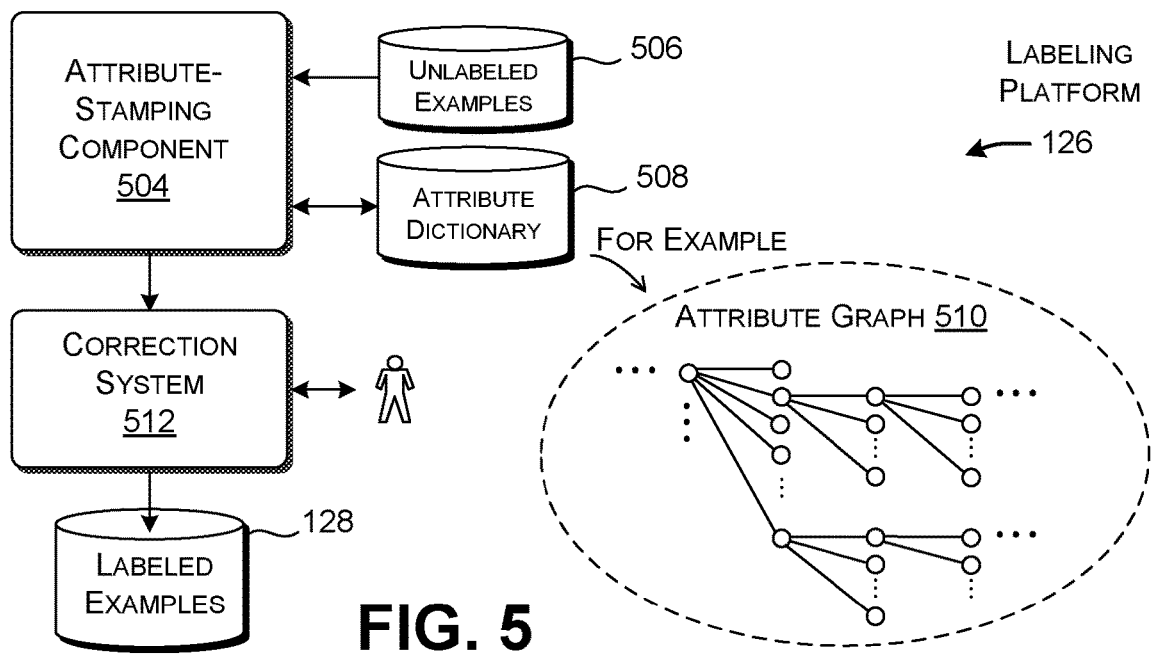
FIG. 5 shows an illustrative labeling platform for use by the training framework of FIG. 1 in producing a collection of labeled training examples.
Figure 6:
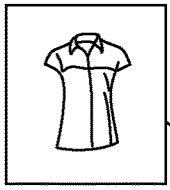
FIG. 6 shows an illustrative user interface presentation provided by the labeling platform of FIG. 5.

Now referring to the validation information generating flow 108, this pipeline of functions produces the validation information, which, in turn, is used by the re-weighting component 122 in the T-S learning flow 106 to perform its re-weighting operation. To begin with, a labeling platform produces labeled training examples. Each labeled training example includes a sequence of tokens (words and/or other linguistic units), at least some of which are assigned a label in a manual process and/or by some other process that is more deterministic than that used by the teacher model 118. FIGS. 5 and 6, to be described below in turn, shows one example of a labeling platform. A data store 128 stores the labeled training examples.

As a whole, the labeled training examples contain more accurate tag assignments compared to the original pseudo-labeled training examples in the data store 116. However, assume that the process for producing the labeled training examples is more resource-intensive and labor-intensive compared to the process that produces the original pseudo-labeled training examples. For this reason, the training framework 102 relies on much more unlabeled training examples (e.g., several thousand examples) compared to labeled training examples (e.g., sixty examples per tag type). To address the lower quality of the unlabeled training examples, the training framework 102 leverages the "expensive" labeled training examples to guide the training that occurs in the T-S learning flow 106 (which relies on the comparatively "inexpensive" unlabeled training examples in the data store 114). More specifically, a sampling component 130 scores the collection of labeled training examples based on their usefulness in guiding the T-S learning flow 106. By leveraging the scores, the T-S learning flow 106 can place more emphasis on the most useful labeled training examples, and less (or no) emphasis on the least useful labeled training examples.

The sampling component 130 assesses usefulness based on at least two factors: model uncertainty and sample similarity. With respect to model uncertainty, the sampling component 130 generates an uncertainty measure for a labeled training example under consideration to determine the extent to which the student model 120 produces uncertain classification results for this labeled training example. A labeled training example with a high uncertainty measure is more valuable in the training performed by the T-S learning flow 106 compared to a labeled training example with a lower uncertainty measure. This is because the T-S learning flow 106 receives more benefit in attempting to learn "difficult" training examples for which the student model 120 produces uncertain classification results, compared to training examples that the student model 120 is able to classify with a high degree of confidence.

With respect to sample similarity, the sampling component 130 generates a similarity measure which measures at extent to which a particular labeled training example under consideration is similar to the unlabeled training examples in the data store 114. A labeled training example with a high similarity score is more valuable in the T-S learning flow 106 compared to a labeled training example with a lower similarity score. This is because the T-S learning flow 106 is most likely to benefit from insights gained from the labeled training examples when they are most similar to the unlabeled training examples in the data store 114, which are the examples on which training is actually performed in the T-S learning flow 106.

Both uncertainty measure and the similarity measure are meaningful because a labeled training example that is uncertain may be dissimilar to the unlabeled training examples, and therefore not a good training example to guide learning. The opposite is true as well: a labeled training example that is similar to the unlabeled training examples may lack uncertainty, making it a poor training example on which to guide learning.

The sampling component 130 compiles validation information based on scored labeled training examples. Each scored labeled training example has a combined score that is a combination (e.g., produced by multiplication or summation) of its uncertainty score and its similarity score. More specifically, in some implementations, the sampling component 130 retains only a prescribed number of the labeled training examples having the highest combined scores. In other examples, the sampling component 130 retains all labeled training examples with combined scores above a prescribed threshold value. In other examples, the sampling component 130 stores all scored labeled training examples, but also preserves the uncertainty and similarity measures associated with the labeled training examples; these scores may be later used to weight the influence of these labeled training examples.

A data store 132 stores the validation information. In some implementations, the validation information includes plural G validation sets 134 ($V_1^L, V_2^L, \ldots V_G^L$), a number of an individual validation set being symbolically designated by g. Each validation set includes a selected set of labeled training examples selected by the sampling component 130. The manner in which the re-weighting component 122 leverages the validation sets 134 will be described below in greater detail.

FIG. 1 indicates that some implementations of the training framework 102 also include masking components (136, 138). For at least some labeled training examples, each masking component masks one or more of its tokens based on predetermined criteria. The process of masking tokens improves training by allowing the T-S learning flow 106 to more effectively focus on the contribution of non-masked tokens. More specifically, the managing component 104 computes a loss measure in the course of updating the student model 120. In doing it, the managing component 104 will ignore the contribution of any masked token in a weighted pseudo-labeled training example, e.g., by not allowing any masked token to contribute to a loss measure. The T-S learning flow 106 improves the robustness of the trained tagging model by removing the noise associated with the masked tokens.

In some examples, the masking components (136, 138) are configured to mask tokens in a prescribed percentage of labeled training examples, such as ten percent. In some examples, a masking component masks a token in a labeled training example that is assigned the catchall type of "other" by the labeling platform 126, indicating that this token has been given an indeterminate classification status by a pre-tagging process flow (to be described further below with reference to FIG. 5). A token having an indeterminate status is a token that does not specifically correspond to specific classes in a vocabulary under consideration. More specifically, the masking components (136, 138) designate the tokens that are considered masks. Training functionality "downstream" of the masking components (136, 138) is guided by these designations by ignoring the contributions of these tokens when computing loss. Each masking component is capable of establishing the masked status of a masked token in any way, including substituting a placeholder token in place of the masked token, annotating the token with a tag to indicate that it is masked, removing the token, etc. The process of "masking" is to be understood as any way of designating a token as masked.

Finally, note that line 140 in FIG. 1 indicates that the T-S learning flow 106 optionally performs learning based on at least some of the labeled training examples produced by the validation information generating flow 108, as masked by the masking component 136. In other words, the T-S learning flow 106 trains the student model 120 based on a training set that includes both weighted pseudo-labeled training examples from the data store 124 and the masked labeled training examples from the validation information generating flow 108, as masked by the masking component 136.

FIG. 2 shows one merely illustrative training process 202 by which the training framework 102, governed by the managing component 104, produces a tagging model, corresponding to the student model 120 when fully trained. From a high-level perspective, the process 202 invokes a first iterative sub-process 204 that is repeated until a prescribed training goal is reached. For instance, the training framework 102 may repeat the sub-process 204 until the classification results produced by the student model 120 reach a prescribed quality threshold value. The sub-process 204 includes, as a part thereof, another sub-process 206, which is repeated for T iterations each time it is invoked.

In block 208, the training framework 102 initializes the model weights of the teacher model 118 and the student model 120. In block 210 of the sub-process 204, the training framework 102 fine-tunes the teacher model 118 based on the labeled training examples, as masked by the masking component 136. In block 212, the teacher model 110 produces a collection of original pseudo-labeled training examples, based on corresponding unlabeled training examples.

Block 214 of the inner sub-process 206 uses the validation-information generating flow 108 to produce validation information based on labeled training examples, as masked by the masking component 138. In block 216, the training framework 102 selects a batch of original pseudo-labeled training examples from the collection of original pseudo-labeled training examples produced in block 212. In block 218, the re-weighting component 122 uses the validation information to produce re-weighting weights for the tokens in the batch of pseudo-labeled training exampled selected in block 216. In block 220, the training framework 102 updates the model weights of the student model 120 based on the original pseudo-labeled training examples chosen in block 216, as modified by the re-weighting weights produced in block 218. Although not shown, block 220 can also update the model weights of the student model 120 based on at least some of the labeled training examples, as masked by the masking component 136. The training framework 102 repeats the series of operations in blocks 214 to 220 for T iterations.

In block 222 of the outer sub-process 204, the training framework 102 updates the model weights of the teacher model 118 based on the current model weights of the student model 120.

Figure 3:
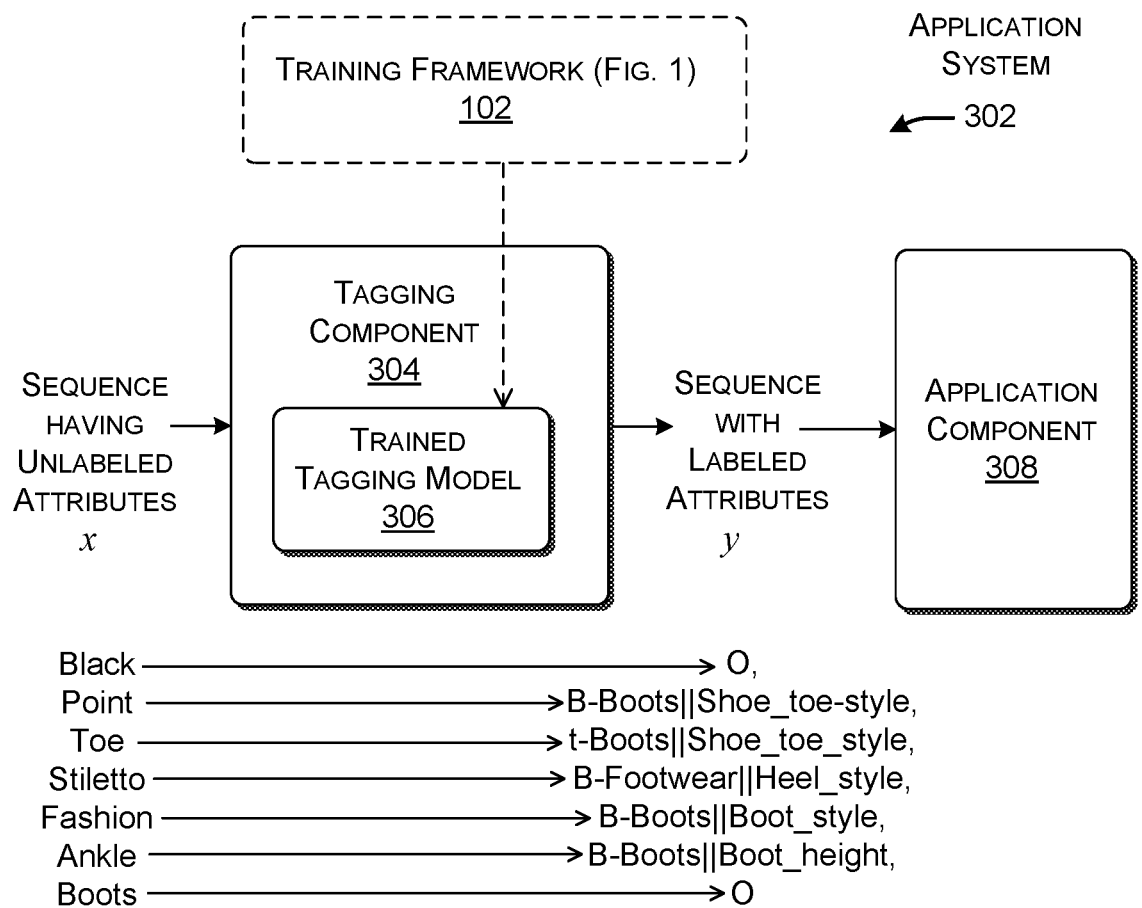
FIG. 3 shows an illustrative application system that uses the trained tagging model produced by the training framework of FIG. 1.

FIG. 3 shows an illustrative application system 302 that uses a tagging component 304 for applying labels to an input sequence x having one or more tokens, to produce a labeled sequence y. The tagging component 304 performs this task using a trained tagging model 306 produced by the training framework 102. That is, the tagging model 306 corresponds to the student model 120 produced by the training framework 102, when fully trained. In some examples, the tokens in the input sequence x correspond to words. The labels in the labeled sequence y specify attribute types associated with the words in the input sequence x. In some cases, a label maps to a single token in the input sequence x. In other cases, a label maps to a span of two or more tokens in the input sequence x.

In some cases, the input sequence x is a title extracted from an ad or other document having one or more words and/or other linguistic units. For example, FIG. 3 shows the case in which the input sequence x corresponds to the sequence "black point toe stiletto fashion ankle boots." This input sequence x corresponds to a title of an ad that describes a certain type of woman's boot. At least some of the tokens in the title describe various characteristics of the boot. Each label in the labeled sequence y describes an attribute type associated with a corresponding token in the input sequence x. For example, the attribute type "B-Boots||Boot-style" describes the type of the token "ankle" in the input sequence x. The attribute type in this case includes an attribute category ("B-Boots") and an attribute subtype or attribute value ("Boot-style"). The same attribute category "B-Boots") can be paired with other attribute subtypes, such as "Boot-height". But the principles set forth herein are applicable to any labeling protocol; in the following description, assume the more general case in which an input sequence x includes tokens, and the sequence y specifies attribute types (also referred to herein as attribute classes) associated with those tokens. The goal of the tagging model 306 is to map the sequence x to the sequence y.

An application component 308 optionally performs any downstream action based on the labeled sequence y. In one case, assume that a user submits an input query to a search engine, corresponding to an input sequence. The tagging component 304 determines the types of attributes in the input query. The application component 308 performs a search based on the words in the input query together with the identified types. For example, the application component 308 uses the types to help interpret the input query. For instance, the application component 308 performs a search based on features that describe the input query, and the identified types serve as some of the features. Alternatively, or in addition, the application component 308 uses the identified types to weight different words in the input query depending on their assessed usefulness, and/or to completely discard or mask one or more words in the input query. The application component 308 performs the search itself using any matching technology, including any of inverted index, an approximate nearest neighbor (ANN) algorithm, a lexical matching mechanism, etc.

In some cases, the application component 308 performs a search to locate one or more matching documents that match the input query. In other cases, the application component 308 performs a search to find one or more advertisements that are suitable to present to the user based on the user's submission of the input query. The term "input query" is intended to broadly encompass a sequence of tokens that a user manually enters into a browser application, and/or content that indirectly indicates a user's current focus of interest. In the latter case, for example, an input query includes text extracted from a web page or document that the user is currently viewing.

Alternatively, or in addition, the application component 308 uses the tagging component 304 to assist it in interpreting a document of any kind to be served to the user upon the occurrence of a triggering circumstances. For example, consider the case in which the document under consideration is a digital ad having various parts, such as a title, description, and metadata. The application component 308 uses the tagging component 304 to determine the attribute types of tokens in one or more parts of the ad, such as its title. The application component 308 uses this knowledge as one factor in selecting an ad that matches the current triggering circumstance. The triggering circumstances may reflect an input query that the user has submitted, a document that the user is viewing, metadata pertaining to the user's current environment, and so on.

In another case, assume that a first input sequence is associated with a first item and a second input sequence is associated with a second item. For example, assume that the first and second sequences correspond to respective titles of the first and second items. Alternatively, the first item is an input query and the second item is a candidate document of any type against which the input query is to be compared. The tagging component 304 determines a first set of classes for the first input sequence and a second set of classes for the second input sequence. The application component 308 leverages this information to determine a relation between the first item and the second item. The application component 308 then performs any action based on the assessed relation. For example, the application component 308 leverages the identified relation to determine whether the second item is a suitable replacement for the second item, and vice versa, or whether the second item is an appropriate target document to serve to the user who supplies the first item.

In another case, the tagging component 304 determines labeled sequences for a plurality of items in a data store. The application component 308 leverages the labeled sequences to perform filtering on specified attribute types. In a related case, again assume that a user submits an input query to a search engine, corresponding to an input sequence. The tagging component 304 presents a graphical control that provides filter options corresponding to identified categories, where those categories are selected based on attribute classes expressed in the input query and/or attribute classes expressed by target items (e.g., corresponding to descriptions of products). The user may interact with the graphical control to select filter options, and then filter a collection of the target items based on the selected filter options. For example, assume that a user submits an input query when shopping for a woman's boot. The application component 308 presents a graphical control for the attribute types of boot style, hoot height, toe style, etc. The user may interact with this graphical control to select an attribute subtype under each category. The application component 308 responds by showing target items that satisfy the user's selections.

The above-described application systems are mentioned by way of example; other implementations leverage the tagging component 304 to perform yet other application functions and combinations of functions.

Figure 4:
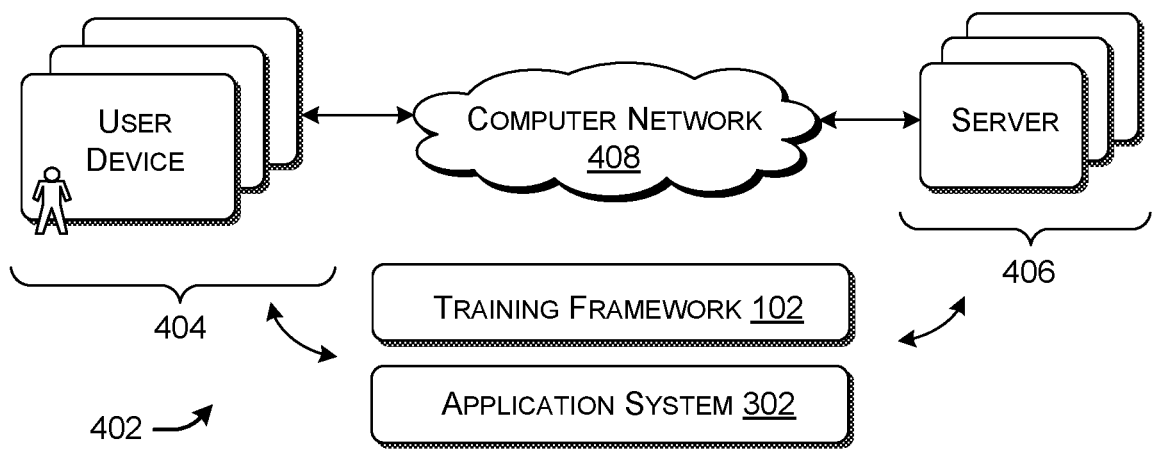
FIG. 4 shows illustrative equipment for implementing the training framework and the application system of FIGS. 1 and 3.

FIG. 4 shows an example of computing equipment 402 that is capable of implementing aspects of the training framework 102 of FIG. 1 and/or the application system 302 of FIG. 3. The computing equipment 402 includes a set of user devices 404 coupled to a set of servers 406 via a computer network 408. Each user device corresponds to any type of computing device, including any of a desktop computing device, a laptop computing device, a handheld computing device of any type (e.g., a smartphone or a tablet-type computing device), a mixed reality device, a wearable computing device, an Internet-of-Things (IOT) device, a gaming system, a media device, a vehicle-borne computing system, any type of robot computing system, a computing system in a manufacturing system, etc. In some implementations, the computer network 408 is implemented as a local area network, a wide area network (e.g., the Internet), one or more point-to-point links, or any combination thereof.

FIG. 4 indicates that the functionality of the training framework 102 and the application system 302 is capable of being spread across the user devices 404 and/or the servers 406 in any manner. For instance, in some cases, each user device with which a user interacts implements a local version of the application system 302. Here, the servers 406 do not play any role in the operation of the application system 302. In other implementations, one or more of the servers 406 implement the entirety of the application system 302. Here, for instance, each user device interacts with the application system 302 using a browser application. In other cases, the functionality associated with the application system 302 is distributed between the servers 406 and each user device in any manner. The training framework 102 is likewise capable of being implemented in a variety of ways by the computing equipment, e.g., using individual user devices 404, the servers 406, or the distributed resources of the user devices 404 and the servers 406.

The technology set forth with respect to FIGS. 1-4 has various advantages over traditional techniques that employ tagging functionality. For instance, the training framework 102 allows a developer to produce a robust tagging model based on a relatively small number of labeled training examples, e.g., created using the labeling platform 126. This capability reduces the amount of labor, effort, and computing resources (memory resources, processing resources, etc.) that go into developing a tagging model, compared to traditional supervised and semi-supervised training techniques. By extension, the above-noted capability also allows the training framework 102 to efficiently develop a tagging model for those problem domains in which there is a large number of label types (such as 200 or more label types). A developer need only use the labeling platform 126 to produce a relatively small set of labeled training examples for each label type. The training framework 102 may be considered scalable in this regard.

The above advantage is particularly pronounced in the domain of product tagging. For example, an online merchant may offer many different products. A different subset of attribute types may be appropriate to each type of product. It is both labor and resource intensive to manually develop a training set for each conceivable attribute type. The training framework 102 reduces the burden of producing such a model by only requiring a small number of labeled training examples for each training type (in one example, 60 labeled training examples per training type). The training framework 102 has the added benefit of masking attribute types that are not recognized (with respect to a specified vocabulary of types), thereby preventing these tokens from introducing noise into the learning process. This is useful in the domain of product tagging, as the attribution information that is necessary to fully describe a kind of product may be extensive; as a result, some of the attribute information may be out-of-vocabulary (OOV) with respect to a particular type vocabulary, meaning that it is not represented by the particular vocabulary. For instance, a type vocabulary may not fully account for the many ways that manufacturers may describe the dimensions of their products.

The training framework 102 achieves the above advantages through the use of the T-S learning flow 106, which automatically generates original pseudo-labeled training examples based on a corpus of unlabeled training examples. The re-weighting component 122 helps prevent model drift that might otherwise arise based on the training performed on noisy training examples. The validation information generating flow 108 is particularly adept at reducing noise through its dual objective of finding labeled training examples for which the student model 120 is uncertain, coupled with finding labeled training examples that are similar to the unlabeled training examples in the data store 114.

The remainder of the disclosure sets forth illustrative implementations of individual components within the training framework 102. Beginning with FIG. 5, this figure shows one implementation of the labeling platform 126, which is used to produce labeled training examples for storage in the data store 128. The labeling platform 126 includes an attribute-stamping component 504 that automatically assigns attributes types and attribute values to a set of unlabeled examples in a data store 506. The attribute-stamping component 504 component performs this task by matching words in the unlabeled examples with predetermined attribute types in an attribute dictionary, stored in a data store 508.

In some implementations, the attribute dictionary is structured as an attribute graph 510. For instance, the attribute dictionary expresses a hierarchical collection of attribute types, ranging from the most general to the most specific. In a shoe-related domain, for example, the attribute graph 510 includes a parent node for "Boot Height." This nodes has child nodes for "ankle," "knee," "mid-calf," "thigh," etc. The attribute stamping component 504 searches the attribute graph 510 using any matching technique, such as by traversing the hierarchy of the attribute graph 510 from broad categories to more narrow categories until it discovers a final match for a word in an input sequence under consideration. The attribute-stamping component 504 will assign a class of "other" to indicate that an attribute value under consideration does not match any known attribute type. This is the kind of token that the masking components (136, 138) designate as masked.

A correction system 512 allows a user (a "tagging user" hereinafter) to manually review and revise the preliminary classifications made by the attribute-stamping component 504. In some implementations, the correction system 512 performs this function by presenting a user interface presentation for each classification made by the attribute-stamping component 502. The user interface presentation displays the classification made by the attribute-stamping tool. The user interface presentation also includes mechanisms that allow the tagging user to confirm and/or revise the classification.

FIG. 6 shows one example of an illustrative user interface presentation 602 produced by the correction system 512. The user interface presentation 602 shows a picture 604 of the product under consideration (here a woman's blouse), together with a textual description of the product. Assume that the picture 604 appears in an ad. In that case, a browser application will direct an end user to a landing page when the end user clicks on the ad. The user interface presentation 602 optionally presents a visual depiction 606 of a least a portion of the landing page to the tagging user. The landing page contains additional information that enables the tagging user to assess what is depicted in the picture 604.

The user interface presentation 602 also includes a section 608 that shows an attribute classification made by the attribute-stamping component 504. The section 608 also provides graphical controls that allow the tagging user to revise the attribute classification. Here, assume that the blouse shown in the picture 604 is made of the fabric "chiffon." The section 608 informs the tagging user of this classification, and provides radio button controls and a text entry box that allow a user to confirm and/or modify this classification.

Figure 7:
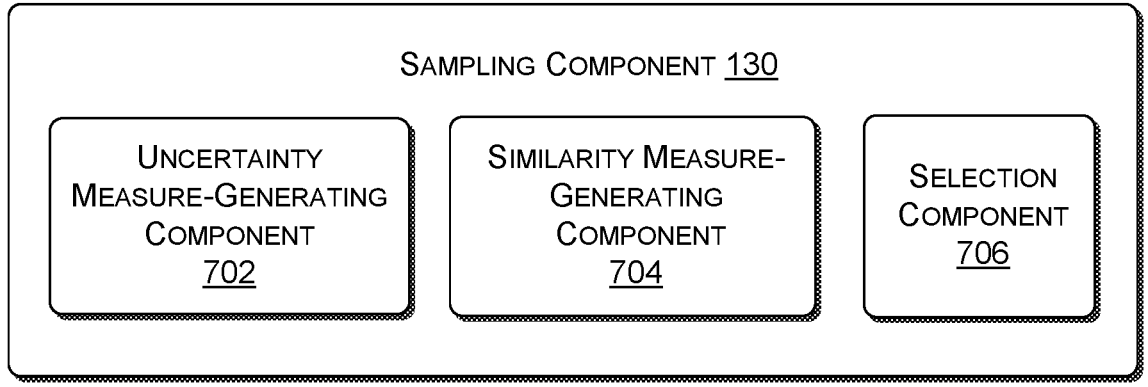
FIG. 7 shows one implementation of a sampling component, which is one part of the training framework of FIG. 1.
Figure 8:
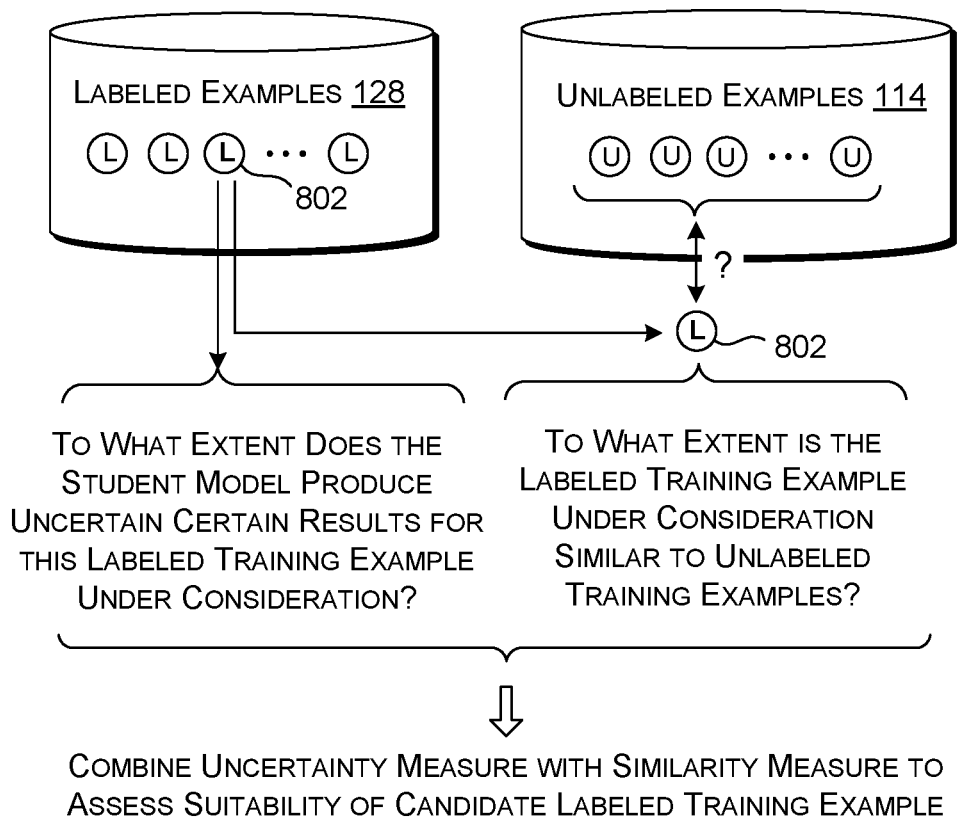
FIG. 8 shows an illustrative manner of operation of the sampling component of FIG. 7.

FIG. 7 shows one example of the sampling component 130. Recall from the description of FIG. 1 that the sampling component 130 assesses the ability of each labeled training example to contribute to productive learning in the T-S learning flow 106. FIG. 7 will be described in conjunction with FIG. 8, which graphically depicts processing performed by the sampling component 130 for an illustrative training example 802 under consideration.

In some implementations, the sampling component 130 includes an uncertainty measure-generating component 702 that determines an uncertainty measure for the labeled training example 802 under consideration. The uncertainty measure specifically assesses an extent to which the student model 120, in its current state of development, would produce uncertain classification results for the labeled training example 802. The sampling component 130 also includes a similarity measure-generating component 704 that determines a similarity measure for the labeled training example 802 under consideration. The similarity measure specifically assesses the extent to which the labeled training example 802 is similar to unlabeled training examples in the data store 114.

A selection component 706 generates the validation information based on the output of the uncertainty measure-generating component 702 and the similarity measure-generating component 704. For instance, the selection component 706 selects a predetermined number of labeled training examples having the most favorable (e.g., the highest) combined measures. A combined measure for the labeled training example 802 under consideration is the combination of its uncertainty measure and its similarity measure. Combination can be performed via multiplication, addition, concatenation, etc.

In some implementations, the uncertainty measure-generating component 702 performs it function by first determining an average loss measure over plural iterations using the following equation:

$$\mathcal{B}_m^{(t)} = \frac{1}{\min(R, t) \cdot N} \sum_{r=1}^{\min(R,t)} \sum_{n=1}^{N} \mathcal{L}(y_{m,n}^L f(x_{m,n}^L; \theta_{stu}^{(t-r)})). \quad (1)$$

Equation (1) is performed for a labeled training example m under consideration that has N tokens (e.g., words), where n refers to any individual word. Equation (1) sums a loss measure ($\mathcal{L}(\cdot)$) over R iterations, starting with a specified iteration t, unless t is less than R (upon which Equation (1) sums the loss measure over t iterations). Equation (1) then divides the resultant sum by the number of loss measures (min(R,t)·N) that have been summed to together. Each individual loss measure for a particular token ($x_{m,n}^L$) under consideration reflects a loss between a given label ($y_{m,n}^L$) and a predicted label computed by the student model 120 at a particular training iteration, wherein the model weights at this time are given by $\theta_{stu}^{(t-r)}$. The superscript L indicates that the token and label under consideration originate from a labeled training example.

The uncertainty measure-generating component 702 generates an uncertainty measure $U_m^{(t)}$ by computing the difference between the average loss $\mathcal{B}_m^{(t)}$ computed in Equation (1) and an average loss measure for the current iteration t:

$$U_m^{(t)} = \max\left(\mathcal{B}_m^{(t)} - \frac{1}{N}\sum_{n=1}^{N} \mathcal{L}(y_{m,n}^L, f(x_{m,n}^L; \theta_{stu}^{(t)})), 0\right) + \delta. \quad (2)$$

Equation (2) specifically takes the maximum of the above-identified difference or zero. Equation (2) then sums the above result by an environment-specific smoothing factor 8. Generally, the T-S learning flow 106 receive the most benefit from those training examples that are associated with the greatest loss measures. From the opposite perspective, the T-S learning flow 106 receives less benefit from training examples that are associated with very small loss measures because the T-S learning flow 106 is given little feedback on which to improve its model weights. Equation (2) assesses loss decay, which expresses an extent to which the average loss for the current iteration is a marked departure from the prior measured loss measures. This difference measure is used to smooth the estimation of loss, which can otherwise vary significantly across training examples.

The similarity measure-generating component 704 measures the degree of similarity between the particular labeled training example m under consideration and plural unlabeled training examples, to provide plural individual similarity measures. The similarity measure-generating component 704 assesses similarity between two sequences using any distance metric, such as cosine similarity, Euclidean (Manhattan) difference, etc. The similarity measure-generating component 704 then generates an overall similarity measure $S_m$ based on a combination of the individual similarity measures, such as by taking the average of the individual similarity measures. In some implementations, the sampling component 130 computes a combined score $W_m$ for the labeled training example m by multiplying this example's uncertainty measure $U_m$ by its similarity measure $S_m$.

Now turning to the re-weighting component 122 in the T-S learning flow 106, recall from the description of FIG. 1 that this component weights each token n of a pseudo-labeled training example m under consideration by a token-specific weight, which, in turn, is computed based on the validation information generated by the validation information generating flow 108. In one implementation, the re-weighting component 122 performs this function by calculating the gradient ($u_{m,n,s}^{(t)}$) given by the following equation, where $V_g^L$ is a validation set in the validation information, in a group of G validation sets:

$$u_{m,n,g}^{(t)} = \quad (3)$$

$$-\frac{\partial}{\partial \epsilon_{m,n,g}} \left( \frac{\sum_{m\_v=1}^{|V_g^L|} \sum_{n\_v=1}^{N\_v} \mathcal{L}(y_{m\_v,n\_v}^L, f(x_{m\_v,n\_v}^L; \theta_{stu}^{(t)}(\epsilon)))}{|V_g^L| \cdot N\_v} \right)\Bigg|_{\epsilon_{m,n,g}=0}.$$

In this equation, the loss measure $\mathcal{L}(\cdot)$ is computed with respect to a particular label $y_{m\_v,n\_v}^L$ of a token $x_{m\_v,n\_v}^L$ at position n_v in a labeled training example m_v having N_v tokens. The symbol "v" used here is meant to indicate that the tokens and examples originate from the validation information. The loss measure specifically expresses the difference between the particular label and the label computed by the student model 120 at the current iteration t. The symbol $\epsilon$ expresses a perturbation that is applied on a token-level basis in the student model 120. The inner quotient computes the average loss over all of the labeled training examples in the validation set, e.g., by summing the individual losses, and dividing by the total number of individual loss measures that have been summed. Overall, Equation (3) computes the gradient (the maximum decrease, as conveyed by $\in_{m,n,g=0}$ of the average loss measure with respect to the token-level weight $\in$, with respect to a single gradient descent step. Note that the gradient is a token-specific measure that is used to weight the tokens of the pseudo-labeled training examples, but is computed, per Equation (3), based on training examples in the validation set. Note that the tokens used in the validation set are not the tokens processed in the T-S learning flow 106, which is performed on unlabeled training data.

The re-weighting component 122 then generates, on a token by token basis, a final weighting value $w_{m,n}^{(t)}$ by summing the individual gradient values for the different validation sets:

$$w_{m,n}^{(t)} = \max\left(\frac{1}{G}\sum_{g=1}^{G} u_{m,n,g}^{(t)}, 0\right). \quad (4)$$

Equation (4) takes the maximum of the summation or zero, to filter out negative weighting values that might degrade the quality of training. Finally, the managing component 104 updates the model weights of the student model 120 based on the following equation:

$$\theta_{stu}^{(t)} = \theta_{stu}^{t-1} - \alpha \nabla \left(\frac{1}{M}\frac{1}{N}\sum_{m=1}^{M}\sum_{n=1}^{N}\left(w_{m,n}^{(t)} \cdot \mathcal{L}\left(y_{m,n}^{(t)}, f\left(x_{m,n}^{U}; \theta_{stu}^{(t-1)}\right)\right)\right)\right). \quad (5)$$

In this equation, $\theta_{stu}^{t-1}$ refers to the previous model weights of the student model 120 at the last training iteration (t−1). $x_{m,n}^{U}$ refers to a token n in a pseudo-labeled training example m, with the superscript U indicating that the token n originates from the set of unlabeled training examples. $f(x_{m,n}^{U}; \theta_{stu}^{t-1})$ refers to the prediction of a label made by the student model for the token n. The weight $w_{m,n}^{(t)}$, computed using Equation (4), modifies the loss $\mathcal{L}(\cdot)$ computed for the token n. The symbol α is a step size constant. In general, Equation (5) applies a token-specific weight ($w_{m,n}^{t}$) computed based on the validation information to a particular token ($x_{m,n}^{U}$) of a pseudo-labeled training example. As explained above, there is no alignment or agreement between the tokens processed by the validation information generating flow 108 and the tokens processed by the T-S learning flow 106, because they originate from different training examples. Further note that the weights used in Equations (4) and (5) are computed based on the validation sets 134, which means that the scores computed in the validation information flow 108 only indirectly affect the T-S learning flow 106. This means that the scores computed for the validation information flow 108 are not the same as the weights actually used in the T-S learning flow 106. Finally note that $\theta_{stu}^{(t)}(\in)$ that appears in Equation (3) is expressible using Equation (5), with the exception that $\in_{m,n}^{(t)}$ will replace $w_{m,n}^{(t)}$.

Figure 9:
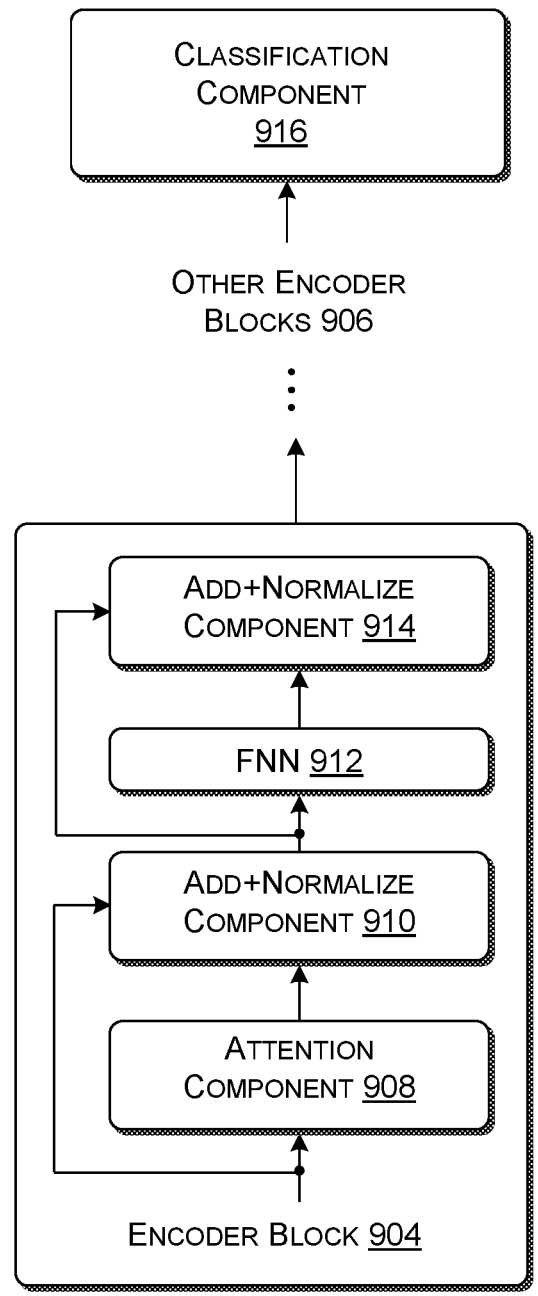
FIG. 9 shows a transformer-based model, which, in some implementations, is used to implement both the teacher model and the student model in the training framework of FIG. 1.

FIG. 9 shows transformer-based model 902 that may be used to implement the teacher model 118 and the student model 120. That is, a first instance of the transformer-based model 902 is used to implement the teacher model 118, and a second instance of the transformer-based model 902 is used to implement the student model 120. The transformer-based model 902 is generally a neural network that uses transformer-based technology.

The transformer-based model 902 includes a pipeline that includes plural encoder blocks (e.g., encoder blocks 904, 906). FIG. 9 shows a representative architecture of the first encoder block 904. Although not shown, other encoder blocks share the same architecture as the first encoder block 904. The first encoder block operates on an encoded representation of a sequence under consideration, e.g., corresponding to an unlabeled training example in the case of the teacher model 118 and a weighted pseudo-labeled training example in the case of the student model 120. A set of input vector express features extracted from the input sequence.

The encoder block 904 includes, in order, an attention component 908, an add-and-normalize component 910, a feed-forward neural network (FFN) 912, and a second add-and-normalize component 914. The attention component 1608 performs self-attention analysis using the following equation:

$$\text{Attention}(Q, K, V) = \text{Softmax}\left(\frac{QK^T}{\sqrt{d}}\right)V. \quad (6)$$

The attention component 908 produces query information Q, key information K, and value information V shown in this equation by multiplying the input vectors fed to the attention component 908 by three respective machine-trained matrices, $W^Q$, $W^K$, and $W^V$. The attention component 908 then takes the dot product of Q with the transpose of K, and divides the dot product by a scaling factor $\sqrt{d}$, to produce a scaled result. The symbol d represents the dimensionality of the transformer-based model 902. The attention component 908 takes the Softmax (normalized exponential function) of the scaled result, and then multiples the result of the Softmax operation by V, to produce attention output information. More generally stated, the attention component 908 determines the importance of each input vector under consideration with respect to every other input vector. Background information regarding the general concept of attention is provided in Vaswani, et al., "Attention Is All You Need," in 31st Conference on Neural Information Processing Systems (NIPS 2017), 2017, 11 pages.

The add-and-normalize component 910 includes a residual connection that combines (e.g., sums) input information fed to the attention component 908 with the output information generated by the attention component 908. The add-and-normalize component 910 then performs a layer normalization operation on the output information generated by of the residual connection, e.g., by normalizing values in the output information based on the mean and standard deviation of those values. The other add-and-normalize component 914 performs the same functions as the first-mentioned add-and-normalize component 910. The FFN 912 transforms input information to output information using a feed-forward neural network having any number of layers.

A classification component 916 classifies a sequence based on information produced by the last encoder blocks 906. The classification component 916 may be implemented as a feed-forward neural network of any type followed by a Softmax component or other type of machine-trained classifier (e.g., a linear regression classifier).

In some implementations, the initial model weights of the teacher model 119 reflect pre-training that has been performed by a pre-training training platform (not shown), typically on a relatively large task-agnostic training set. For example, in one merely illustrative case, the pre-training platform performs training with respect to two tasks. In a first task, the pre-training platform trains the model weights to predict the identity of a word that has been omitted in an input training example. In a second task, the pre-training platform trains the model weights to predict, given two sentences, whether the second sentence properly follows the first sentence. The resultant pre-trained model may be considered general-purpose in nature because it can be further trained or fine-tuned to perform different tasks. General background information on the topic of pre-training is available in Devlin, et al., "BERT: Pre-training of Deep Bidirectional Transformers for Language Understanding," ArXiv, Cornell University, arXiv: 1810.04805v2 [cs.CL], May 24, 2019, 16 pages.

Other implementations may use other technologies, besides transformer-based technology, or in addition to transformer-based technology, to implement the teacher and student models (118, 120). Such technologies include convolutional neural networks, recurrent neural networks, decision tree models, etc.

B. Illustrative Processes

Figure 10:
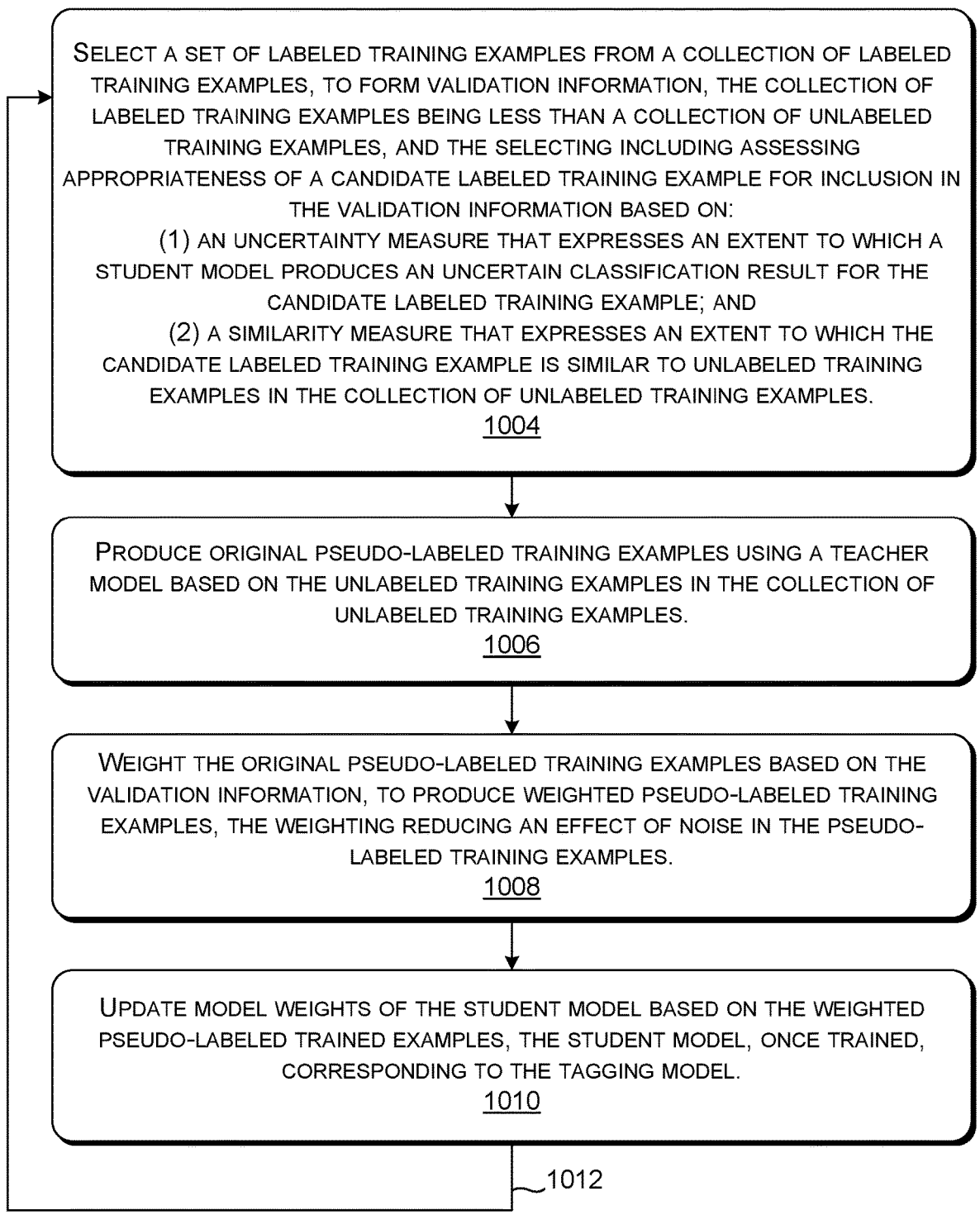
FIG. 10 shows a process that describes one manner of operation of the training framework of FIG. 1.

FIGS. 10 and 11 show illustrative processes that explains one manner of operation of the systems of Section A in flowchart form. Since the principles underlying the operation of the systems have already been described in Section A, certain operations will be addressed in summary fashion in this section. Each flowchart is expressed as a series of operations performed in a particular order. But the order of these operations is merely representative, and varies in other implementations. Further, any two or more operations described below is capable of being performed in a parallel manner. In one implementation, the blocks shown in the flowcharts that pertain to processing-related functions are implemented by the hardware logic circuitry described in Section C, which, in turn, includes one or more processors and/or other logic units that include a task-specific collection of logic gates.

Starting with FIG. 10, this figure shows a process 1002 for generating a tagging model (e.g., 306). In block 1004, the training framework 102 selects a set of labeled training examples from a collection of labeled training examples, to form validation information. The collection of labeled training examples is less than a collection of unlabeled training examples. The selecting includes assessing appropriateness of a candidate labeled training example for inclusion in the validation information based on: (1) an uncertainty measure that expresses an extent to which a student model (e.g., 120) produces an uncertain classification result for the candidate labeled training example; and (2) a similarity measure that expresses an extent to which the candidate labeled training example is similar to unlabeled training examples in the collection of unlabeled training examples.

In block 1006, the training framework 102 produces original pseudo-labeled training examples using a teacher model (e.g., 118) based on unlabeled training examples in the collection of unlabeled training examples. In block 1008, the training framework 102 weights the original pseudo-labeled training examples based on the validation information, to produce weighted pseudo-labeled training examples. The weighting reduces an effect of noise in the original pseudo-labeled training examples. In block 1010, the training framework 102 updates model weights of the student model based on the weighted pseudo-labeled trained examples. The student model, once trained, corresponds to the tagging model. The loop 1012 indicates that the process 1002 is repeated for plural iterations.

FIG. 11 shows a process 1102 for applying a tagging model (e.g., 306) in an application system 302. In block 1104, the application system 302 classifies tokens in a sequence of tokens using the trained tagging model, to produce a classified sequence of tokens. In block 1106, the application system 302 performs an application task based on the classified sequence of tokens.

The trained tagging model is produced by training a student model (e.g., 120) in a training framework (e.g., 102) that includes the student model and a teacher model (e.g., 118). Model weights of the student model are updated based on pseudo-labeled training examples produced by the teacher model for a set of unlabeled training examples selected from a collection of unlabeled training examples. The pseudo-labeled training examples are weighted based on validation information. The validation information, in turn, includes a set of labeled training examples that are selected from a collection of labeled training examples based on plural factors, one of the plural factors being an assessed similarity between the set of labeled training examples and unlabeled training examples in the collection of unlabeled training examples.

C. Representative Computing Functionality

Figure 12:
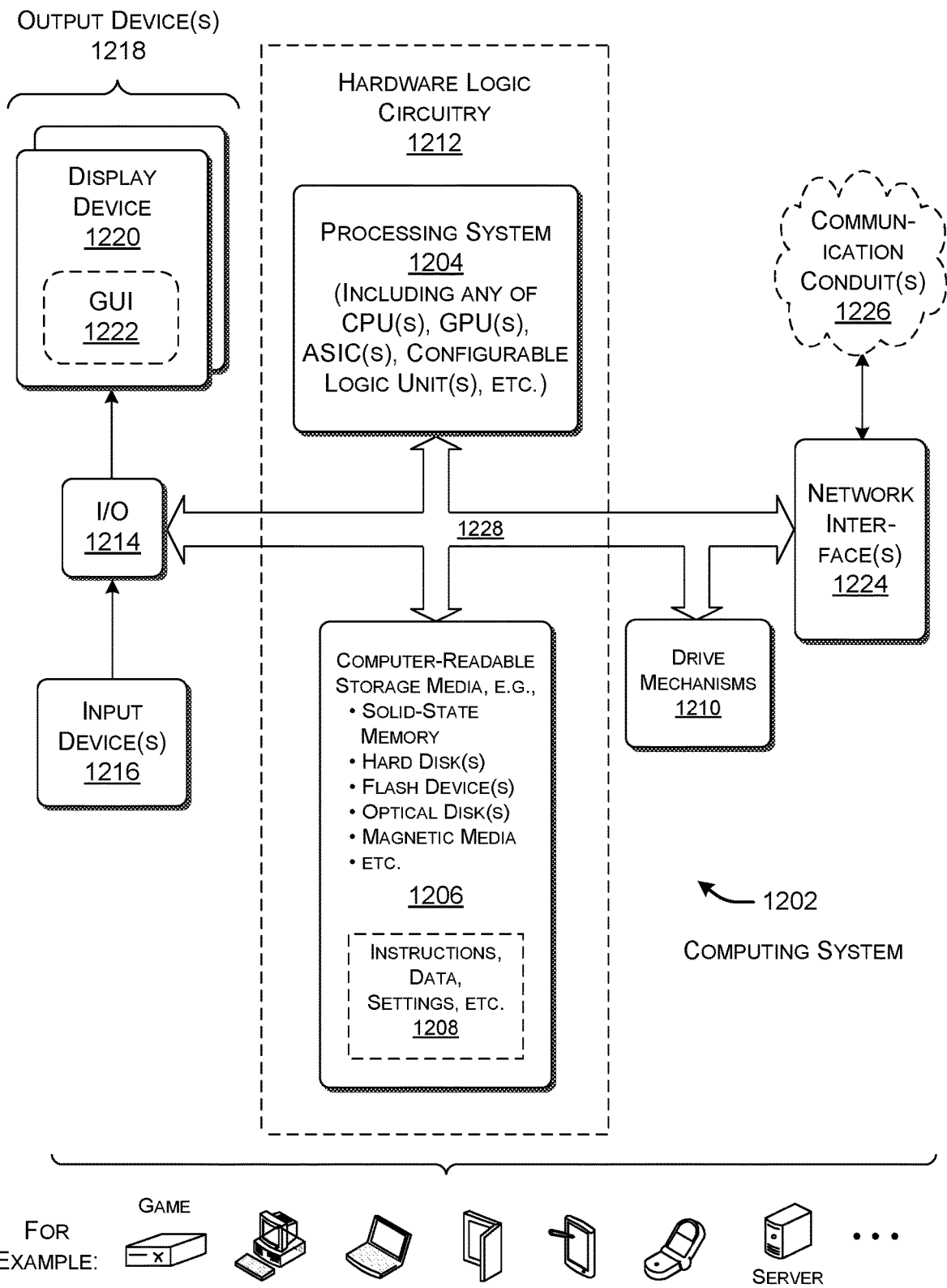
FIG. 12 shows an illustrative type of computing system that, in some implementations, is used to implement any aspect of the features shown in the foregoing drawings.

FIG. 12 shows a computing system 1202 that, in some implementations, is used to implement any aspect of the mechanisms set forth in the above-described figures. For instance, in some implementations, the type of computing system 1202 shown in FIG. 12 is used to implement any user computing device or any server shown in FIG. 4. In all cases, the computing system 1202 represents a physical and tangible processing mechanism.

The computing system 1202 includes a processing system 1204 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 1202 also includes computer-readable storage media 1206, corresponding to one or more computer-readable media hardware units. The computer-readable storage media 1206 retains any kind of information 1208, such as machine-readable instructions, settings, and/or data. For example, in some implementations, the computer-readable storage media 1206 includes one or more solid-state devices, one or more magnetic hard disks, one or more optical disks, magnetic tape, etc. Any instance of the computer-readable storage media 1206 uses any technology for storing and retrieving information. Further, any instance of the computer-readable storage media 1206 represents a fixed or removable unit of the computing system 1202. Further, any instance of the computer-readable storage media 1206 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media.

The computing system 1202 utilizes any instance of the computer-readable storage media 1206 in different ways. For example, in some implementations, any instance of the computer-readable storage media 1206 represents a hardware memory unit (such as Random Access Memory (RAM)) for storing information during execution of a program by the computing system 1202, and/or a hardware storage unit (such as a hard disk) for retaining/archiving information on a more permanent basis. In the latter case, the computing system 1202 also includes one or more drive mechanisms 1210 (such as a hard drive mechanism) for storing and retrieving information from an instance of the computer-readable storage media 1206.

In some implementations, the computing system 1202 performs any of the functions described above when the processing system 1204 executes computer-readable instructions stored in any instance of the computer-readable storage media 1206. For instance, in some implementations, the computing system 1202 carries out computer-readable instructions to perform each block of the processes described in Section B. FIG. 12 generally indicates that hardware logic circuitry 1212 includes any combination of the processing system 1204 and the computer-readable storage media 1206.

In addition, or alternatively, the processing system 1204 includes one or more other configurable logic units that perform operations using a collection of logic gates. For instance, in some implementations, the processing system 1204 includes a fixed configuration of hardware logic gates, e.g., that are created and set at the time of manufacture, and thereafter unalterable. In addition, or alternatively, the processing system 1204 includes a collection of programmable hardware logic gates that are set to perform different application-specific tasks. The latter category of devices includes, including Programmable Array Logic Devices (PALs), Generic Array Logic Devices (GALs), Complex Programmable Logic Devices (CPLDs), Field-Programmable Gate Arrays (FPGAs), etc. In these implementations, the processing system 1204 effectively incorporates a storage device that stores computer-readable instructions, insofar as the configurable logic units are configured to execute the instructions and therefore embody or store these instructions.

In some cases (e.g., in the case in which the computing system 1202 represents a user computing device), the computing system 1202 also includes an input/output interface 1214 for receiving various inputs (via input devices 1216), and for providing various outputs (via output devices 1218). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1220 and an associated graphical user interface presentation (GUI) 1222. The display device 1220 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1202 also includes one or more network interfaces 1224 for exchanging data with other devices via one or more communication conduits 1226. One or more communication buses 1228 communicatively couple the above-described units together.

The communication conduit(s) 1226 is capable of being be implemented in any manner, e.g., by a local area computer network, a wide area computer network (e.g., the Internet), point-to-point connections, or any combination thereof. The communication conduit(s) 1226 includes any combination of hardwired links, wireless links, routers, gateway functionality, name servers, etc., governed by any protocol or combination of protocols.

FIG. 12 shows the computing system 1202 as being composed of a discrete collection of separate units. In some cases, the collection of units corresponds to discrete hardware units provided in a computing device chassis having any form factor. FIG. 12 shows illustrative form factors in its bottom portion. In other cases, the computing system 1202 includes a hardware logic unit that integrates the functions of two or more of the units shown in FIG. 1. For instance, in some implementations, the computing system 1202 includes a system on a chip (SoC or SOC), corresponding to an integrated circuit that combines the functions of two or more of the units shown in FIG. 12.

The following summary provides a set of illustrative examples of the technology set forth herein.

(A1) According to a first aspect, a computer-implemented method for generating a tagging model is described. The method includes selecting a set of labeled training examples from a collection of labeled training examples, to form validation information. The collection of labeled training examples is less than a collection of unlabeled training examples. The selecting includes assessing appropriateness of a candidate labeled training example for inclusion in the validation information based on: an uncertainty measure that expresses an extent to which a student model produces an uncertain classification result for the candidate labeled training example; and a similarity measure that expresses an extent to which the candidate labeled training example is similar to unlabeled training examples in the collection of unlabeled training examples. The method also includes: producing original pseudo-labeled training examples using a teacher model based on the unlabeled training examples in the collection of unlabeled training examples; weighting the original pseudo-labeled training examples based on the validation information, to produce weighted pseudo-labeled training examples, the weighting reducing an effect of noise in the pseudo-labeled training examples; and updating model weights of the student model based on the weighted pseudo-labeled trained examples. The student model, once trained, corresponds to the tagging model.

(A2) According to some implementations of the method of A1, the method further include repeating the selecting, producing, weighting, and updating plural times.

(A3) According to some implementations of the method of A2, the method further includes using the tagging model, following the repeating, to classify tokens in a sequence of tokens.

(A4) According to some implementations of the method of A3, the sequence of tokens describes characteristics of an identified product.

(A5) According to some implementations of any of the methods of A1-A4, the method further includes, after a prescribed number of repetitions of the selecting, producing, weighting, and updating, updating model weights of the teacher model based on current model weights of the student model.

(A6) According to some implementations of any of the methods of A1-A5, the method further includes, prior to the selecting, and for at least some of the collection of labeled training examples, masking at least part of the labeled training examples.

(A7) According to some implementations of the method of A5, the masking includes masking tokens that have been given an indeterminate classification status.

(A8) According to some implementations of any of the methods of A1-A7, the updating the model weights of the student model is also performed based on labeled training examples from the collection of labeled training examples.

(A9) According to some implementations of any of the methods of A1-A8, the method further includes generating the similarity measure by: forming individual similarity measures, each individual similarity measure expressing similarity between the candidate labeled training example and a particular unlabeled training example; and forming an overall similarity measure based on the individual similarity measures.

(A10) According to some implementations of the method of A9, the overall similarity measure is an average of the individual similarity measures.

(B1) According to a second aspect, a computer-implemented method for applying a tagging model includes: classifying tokens in a sequence of tokens using a trained tagging model, to produce a classified sequence of tokens; and performing an application task based on the classified sequence of tokens. The trained tagging model is produced by training a student model in a training framework that includes the student model and a teacher model. Model weights of the student model are updated based on pseudo-labeled training examples produced by the teacher model for unlabeled training examples in a collection of unlabeled training examples. The pseudo-labeled training examples are weighted based on validation information. The validation information includes a set of labeled training examples that are selected from a collection of labeled training examples based on plural factors, one of the plural factors being an assessed similarity between the set of labeled training examples and unlabeled training examples in the collection of unlabeled training examples.

(B2) According to some implementations of the method of B1, the sequence of tokens corresponds to a title of a product, wherein at least some of the tokens describe attributes of the product, and wherein the classifying classifies the types of the attributes.

(B3) According to some implementations of the method of B1, the performing an application task includes performing a search operation, matching operation, and/or filtering operation based on the classified sequence of tokens.

(B4) According to some implementations of any of the methods of B1-B3, another factor used to select the labeled set of training examples in the validation information is an assessed uncertainty of classification results produced by the student model for the labeled set of training examples.

(B5) According to some implementations of any of the methods of B1-B4, for at least some of the set of labeled training examples, parts of the labeled training examples are masked.

(B6) According to some implementations of the method of B5, the masking includes masking tokens that have been given an indeterminate classification status.

(C1) According to a third aspect, another computer-implemented method for generating a tagging model is described. The method includes selecting a set of labeled training examples from a collection of labeled training examples based on plural factors, to form validation information. One of the plural factors is an assessed similarity between the set of labeled training examples and unlabeled training examples in a collection of unlabeled training example. The method further includes: producing original pseudo-labeled training examples using a teacher model based the unlabeled training examples in the collection of unlabeled training examples; weighting the original pseudo-labeled training examples based on the validation information, to produce weighted pseudo-labeled training examples; updating model weights of the student model based on the weighted pseudo-labeled trained examples; and repeating the selecting, producing, weighting, and updating plural times until a training objective is achieved. The student model, after the repeating, corresponds to a tagging model for use in classifying a sequence of tokens.

In yet another aspect, some implementations of the technology described herein include a computing system (e.g., the computing system 1202) that includes a processing system (e.g., the processing system 1204) having a processor. The computing system also includes a storage device (e.g., the computer-readable storage media 1206) for storing computer-readable instructions (e.g., information 1208) that, when executed by the processing system, perform any of the methods described herein (e.g., any of the methods of A1-10, B1-B6, or C1).

In yet another aspect, some implementations of the technology described herein include a computer-readable storage medium (e.g., the computer-readable storage media 1206) for storing computer-readable instructions (e.g., the information 1208). A processing system (e.g., the processing system 1204) executes the computer-readable instructions to perform any of the operations described herein (e.g., the operation in any of the methods of A1-10, B1-B6, or C1).

More generally stated, any of the individual elements and steps described herein combinable, for example, into any logically consistent permutation or subset. Further, any such combination is capable of being be manifested as a method, device, system, computer-readable storage medium, data structure, article of manufacture, graphical user interface presentation, etc. The technology is also expressible as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1212 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that are to be considered optional; generally, any feature is to be considered as optional, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of," is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. A "set" includes zero members, one member, or more than one member. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for generating a tagging model, comprising:
    selecting a set of labeled training examples from a collection of labeled training examples, to form validation information,
    the collection of labeled training examples being less than a collection of unlabeled training examples, and
    the selecting including assessing appropriateness of a candidate labeled training example for inclusion in the validation information based on: an uncertainty measure that expresses an extent to which a student model produces an uncertain classification result for the candidate labeled training example; and a similarity measure that expresses an extent to which the candidate labeled training example is similar to unlabeled training examples in the collection of unlabeled training examples;
    producing original pseudo-labeled training examples using a teacher model based on the unlabeled training examples in the collection of unlabeled training examples;
    weighting the original pseudo-labeled training examples based on the validation information, to produce weighted pseudo-labeled training examples, the weighting reducing an effect of noise in the pseudo-labeled training examples; and
    updating model weights of the student model based on the weighted pseudo-labeled trained examples,
    the student model, once trained, corresponding to the tagging model.

2. The computer-implemented method of claim 1, further including repeating the selecting, producing, weighting, and updating plural times.

3. The computer-implemented method of claim 2, further including using the tagging model, following the repeating, to classify tokens in a sequence of tokens.

4. The computer-implemented method of claim 3, wherein the sequence of tokens describes characteristics of an identified product.

5. The computer-implemented method of claim 1, further comprising, after a prescribed number of repetitions of the selecting, producing, weighting, and updating, updating model weights of the teacher model based on current model weights of the student model.

6. The computer-implemented method of claim 1, further including, prior to the selecting, and for at least some of the collection of labeled training examples, masking at least part of the labeled training examples.

7. The computer-implemented method of claim 6, wherein the masking includes masking tokens that have been given an indeterminate classification status.

8. The computer-implemented method of claim 1, wherein the updating the model weights of the student model is also performed based on labeled training examples from the collection of labeled training examples.

9. The computer-implemented method of claim 1, further including generating the similarity measure by:
    forming individual similarity measures, each individual similarity measure expressing similarity between the candidate labeled training example and a particular unlabeled training example; and
    forming an overall similarity measure based on the individual similarity measures.

10. The computer-implemented method of claim 9, wherein the overall similarity measure is an average of the individual similarity measures.

11. A computing system, comprising:

a processing system comprising a processor; and a storage device for storing machine-readable instructions that, when executed by the processing system, perform operations comprising:

classifying tokens in a sequence of tokens using a trained tagging model, to produce a classified sequence of tokens; and performing an application task based on the classified sequence of tokens, the trained tagging model being produced by training a student model in a training framework that includes the student model and a teacher model, model weights of the student model being updated based on pseudo-labeled training examples produced by the teacher model for unlabeled training examples in a collection of unlabeled training examples, the pseudo-labeled training examples being weighted based on validation information, and the validation information including a set of labeled training examples that are selected from a collection of labeled training examples based on plural factors, one of the plural factors being an assessed similarity between the set of labeled training examples and unlabeled training examples in the collection of unlabeled training examples.

12. The computing system of claim 11, wherein the sequence of tokens corresponds to a title of a product, wherein at least some of the tokens describe attributes of the product, and wherein the classifying classifies the types of the attributes.

13. The computing system of claim 11, wherein the performing an application task includes performing a search operation, matching operation, and/or filtering operation based on the classified sequence of tokens.

14. The computing system of claim 11, wherein another factor used to select the labeled set of training examples in the validation information is an assessed uncertainty of classification results produced by the student model for the labeled set of training examples.

15. The computing system of claim 11, wherein, for at least some of the set of labeled training examples, parts of the labeled training examples are masked.

16. The computing system of claim 15, wherein the masking includes masking tokens that have been given an indeterminate classification status.

17. A computer-readable storage medium for storing computer-readable instructions, wherein a processing system executing the computer-readable instructions performs operations comprising:

selecting a set of labeled training examples from a collection of labeled training examples based on plural factors, to form validation information, one of the plural factors being an assessed similarity between the set of labeled training examples and unlabeled training examples in a collection of unlabeled training examples;

producing original pseudo-labeled training examples using a teacher model based the unlabeled training examples in the collection of unlabeled training examples;

weighting the original pseudo-labeled training examples based on the validation information, to produce weighted pseudo-labeled training examples;

updating model weights of the student model based on the weighted pseudo-labeled trained examples; and repeating the selecting, producing, weighting, and updating plural times until a training objective is achieved, the student model, after the repeating, corresponding to a tagging model for use in classifying a sequence of tokens.

18. The computer-readable storage medium of claim 17, wherein another factor of the plural factors is an extent to which the student model produces uncertain classification results for the set of labeled training examples.

19. The computer-readable storage medium of claim 17, further including, prior to the selecting, masking at least part of labeled training examples in the collection of labeled training examples.

20. The computer-readable storage medium of claim 19, wherein the masking includes masking tokens that have been given an indeterminate classification status.

* * * * *